Dec. 7, 1926. 1,610,212
H. BOLTSHAUSER
WATER RECOOLING APPARATUS FOR CONDENSING PLANTS ON STEAM DRIVEN VEHICLES
Filed August 28, 1923 2 Sheets-Sheet 1
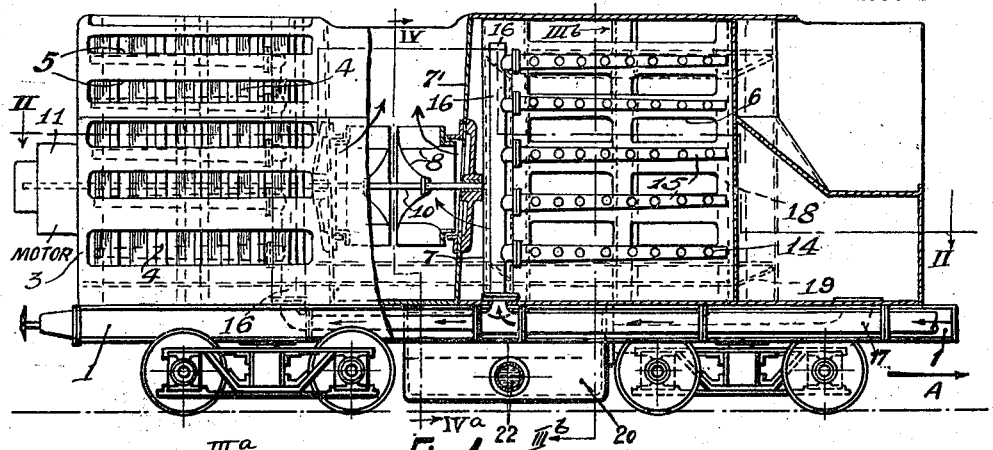
Fig. 1
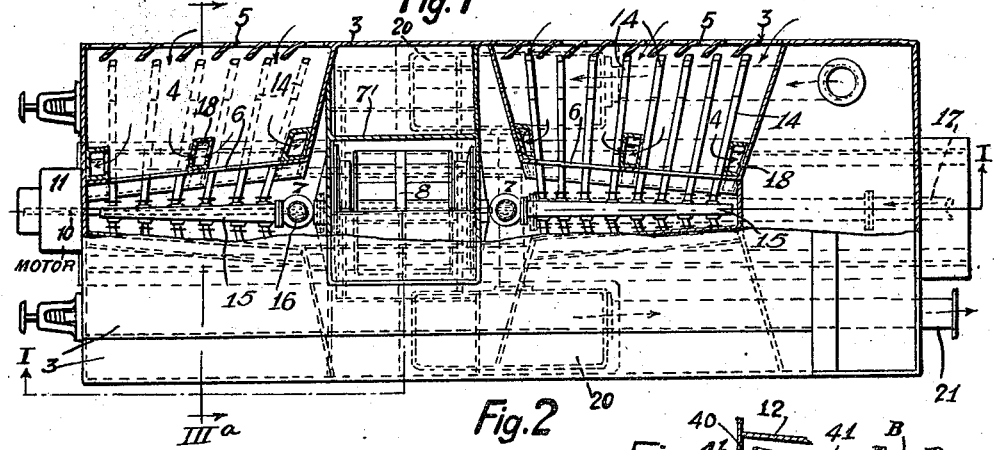
Fig. 2
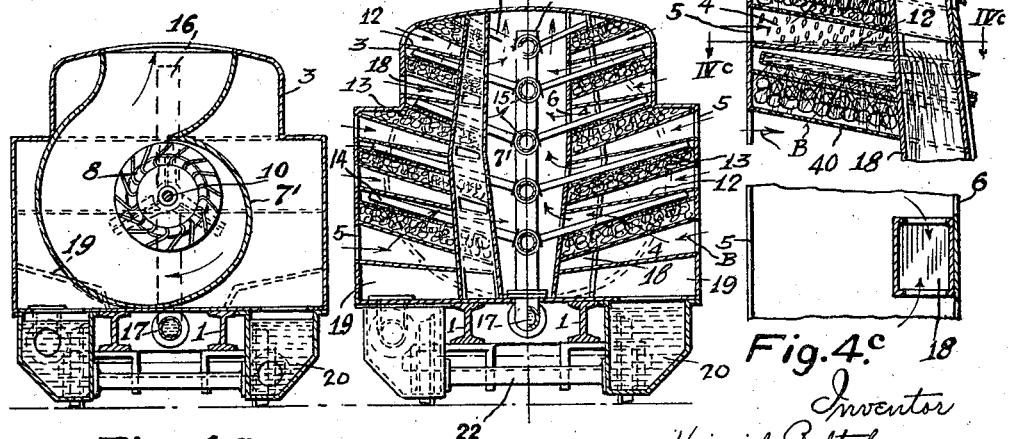
Fig. 4ª        Fig. 3.
Inventor
Heinrich Boltshauser,
By Henry Orth
Atty.

Dec. 7, 1926.  
H. BOLTSHAUSER  
1,610,212  
WATER RECOOLING APPARATUS FOR CONDENSING PLANTS ON STEAM DRIVEN VEHICLES  
Filed August 28, 1923 2 Sheets-Sheet 2

Inventor  
Heinrich Boltshauser  
By Henry Orth atty.

Patented Dec. 7, 1926.

1,610,212

UNITED STATES PATENT OFFICE.

HEINRICH BOLTSHAUSER, OF ZURICH, SWITZERLAND.

WATER-RECOOLING APPARATUS FOR CONDENSING PLANTS ON STEAM-DRIVEN VEHICLES.

Application filed August 28, 1923, Serial No. 659,788, and in Switzerland September 2, 1922.

The object of the present invention is to provide a re-cooler working with artificial draught of ample capacity for re-cooling the cooling water for the condenser of a large locomotive. To this end artificially generated currents of cooling air are deviated according to the invention in the interior of sections or cells by means of distributing structures in a direction in which the cooling air will at least along a short path find passage areas that are at least twice as large as the entrance or exit areas of the sections or cells. Thereby the smallest velocities of the cooling air current are obtained within the most effective cooling zone. Preferably the distributing structures in the sections are arranged in a substantially diagonal manner.

Constructional examples of the subject matter of the present invention are illustrated on the accompanying drawings, in which:

The right hand end of Fig. 1 is a vertical longitudinal section on the line I—I of Fig. 2, and the left hand end is a side view of a re-cooler having a lateral entrance for the air and built as a vehicle, and The lower part of Fig. 2 is a plan view and the upper part is a section along line II—II of Fig. 1, the distributing structures shown in Fig. 3 as trays being omitted for the sake of clearness.

The left hand end of Fig. 3 is a section along line III$^a$—III$^a$ of Fig. 2, and the right hand end is a section on line III$^b$—III$^b$ of Fig. 1.

Figure 4:
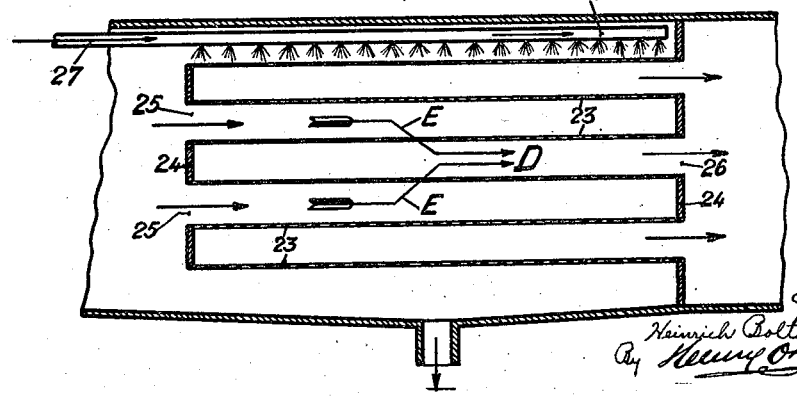

Fig. 4 shows diagrammatically in a vertical section a further constructional example.

Fig. 4$^a$ is a vertical section on line IV$^a$—IV$^a$ of Fig. 1;

Figs. 4$^b$ and 4$^c$ show in a vertical and a horizontal section respectively, and on a larger scale, details of the re-cooler illustrated in Figs. 1 to 3, Fig. 4$^c$ being a section on the line IV$^c$—IV$^c$ of Fig. 4$^b$.

Figure 7:
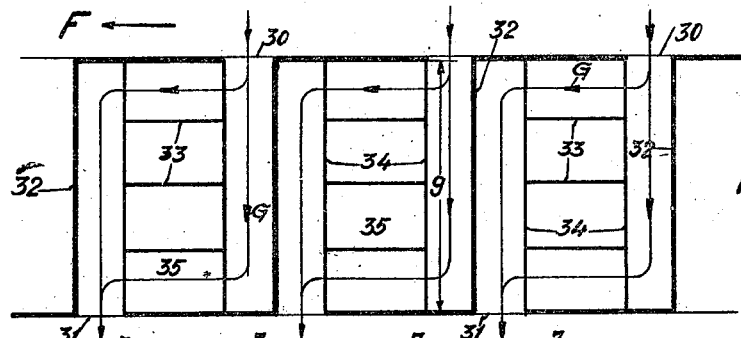
Figure 5:
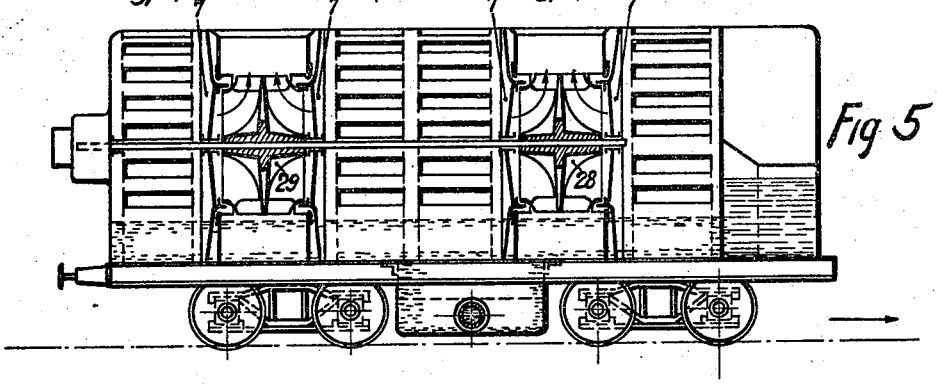
Figure 6:
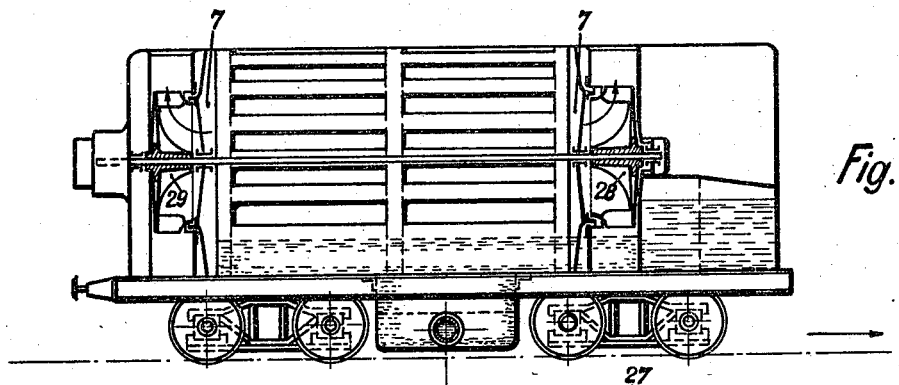

Figs. 5 and 6 show longitudinal sections of re-coolers of the type illustrated in Figs. 1–3 with two fans, and Fig. 7 shows a further constructional example in a purely diagrammatic manner.

Referring now to Figs. 1–3, 4$^a$, 4$^b$ and 4$^c$ of the drawings, 1 denotes a locomotive tender which travels in the direction indicated by the arrow A. On the tender 1 an oblong casing 3 closed at both ends is arranged, the cross-section of the casing conforming substantially to the railway clearance gauge. The casing 3 is provided with a plurality of sections or cells 4 for the air, the entrance openings 5 of which are situated in the lateral walls of the casing 3 while the exit openings 6 terminate in channels 7. The latter are arranged in the longitudinal axis of the vehicle and are symmetrically arranged on both sides of an air delivering device designed as twin fan 8. The channels 7 become narrower from the centre of the vehicle towards the two ends. The fan 8 discharges into a spiral casing 7$^1$ having its discharge opening at the top of the vehicle and it is driven by means of a shaft 10 arranged parallel to the longitudinal axis of the vehicle, rotation being imparted to the shaft, for instance by the electric motor 11. The sections or cells 4 are separated from each other by walls 12 (Figs. 3 and 4$^b$) so that they form compartments each traversed by a separate air current. 13 denotes distributing structures arranged inside the sections 4. These structures may, for instance, comprise a lower and an upper sieve-like wall 40 (Fig. 4$^b$) arranged to form trays or grids and irregularly disposed bodies 41, for example rings, filled into the space between said walls. The structures 13 are arranged in a substantially diagonal manner in the sections 4 so that each structure is traversed by a separate air current. The cooling air currents are deviated by the trays 13. As indicated in Fig. 3 and Fig. 4$^b$ by arrow B a two-fold deviation is caused in the present instance in consequence of the oblique arrangement of the trays 13, whereby each of the separate air currents finds in its appropriate tray, along a short path, passage areas which are at least twice as large as the entrance area 5 or the exit area 6 of the respective section 4. Thus a diminution of the velocity of the cooling air is caused at least immediately in front of each tray 13 and in any case within the most effective cooling zone. Over each tray 13 a separate current of water is distributed by sprinkler pipes 14. The latter branch off from horizontal pipes 15 which are in turn connected to vertical branches 16. The latter branch off a main conduit 17 which conducts the heated cooling water from a condenser not shown to the tender 1. The water that has been re-cooled in the sections 4 flows into channels 18 which conduct it to a collecting tank 19 provided in the casing 3. The collecting tank 19 is in open connection with two containers 20 arranged in the lower part of the tender 1. From one of the containers 20 a pipe 21 (Fig. 2) branches off and conducts the re-cooled water back to the locomotive. The two containers 20 are interconnected by a pipe 22.

During the working the cooling air enters laterally into the sections 4 and is sucked by the fan 8 through said sections and through the channels 7 and delivered into the spiral casing 7¹ from where it is discharged directly into the open atmosphere. No separate discharge channel for the heated air has to be provided so that the best possible utilization of the available space for re-cooling purposes results. The cooling air flows partly in a cross-current and partly in a counter-current (the latter within the trays 13) into intimate contact with the water that is finely distributed over the material in the trays so that the water is re-cooled to a low temperature. The re-cooling action is very effective and the power required for driving the fan 8 is small as each section 4 is traversed by a separate air current of low temperature and as large cross-sectional areas for the entrance and the passage of the air are provided, so that it can be worked with large quantities of air and small velocities of the air currents and consequently with comparatively small resistances within the cells. In the deviated path of the air current the trays cause an effective distribution of the air as well as of the water and assist thereby in a large degree in obtaining a strong re-cooling action.

Instead of the illustrated trays 13, sieves, perforated plates and the like may be used as distributing structures effecting the deviation of the air current. An arrangement utilizing perforated plates as distributing structures is diagrammatically illustrated in Fig. 4 in which a plurality of perforated plates 23 and walls 24 are arranged one above the other within the cooling zone which form together passages or sections for the separate air currents entering at 25 and leaving at 26. The various passages arranged one above the other are traversed by a stream of water common to all the sections, which stream is distributed over the cooling zone by the distributing sprinkler pipes 27 (only one of which is shown in Fig. 4).

The perforated plates 23 cause (as is indicated by the arrow D in Fig. 4) a deviation of the air currents between the entrance openings 25 and the exit openings 26; in the deviated part E of the air currents the passage area is several times larger than it is in the planes 25 and 26 of the entrance and the exit respectively. The plates 23 may be arranged at any angle to each other and the air may enter at the sides or at the front of the vehicle, as will be easily understood with reference to Figs. 1–3 showing the arrangement for an entrance at the sides.

In order to obtain the largest possible total cross-sectional area for the entrance of the cooling air a portion of the entrance areas of the sections or cells 4 can be arranged in the front and back wall of the casing 3 so that the air is sucked in at the ends as well as at the sides of the vehicle. The fan 8 does not need to be disposed in the longitudinal centre of the vehicle, and instead of a twin fan two fans 28 and 29 may be provided as is shown in Figs. 5 and 6. In Fig. 5 both fans are arranged towards the centre of the vehicle, while in Fig. 6 the fans are disposed at the ends of the channels 7.

In the diagrammatic Fig. 7 of the drawing, which shows a horizontal section through a re-cooling installation, 30 denotes the entrance area and 31 the exit area for the air of sections or cells 32. Each of the sections 32 is provided with a distributing structure 34 having partition walls 33. Arrow F indicates the direction of travelling. A plurality of sections 32 are arranged one after the other and they may also be arranged above each other. The exit areas 31 are in the same manner as the exit areas 6 in Figs. 1–3, connected to channels not illustrated in Fig. 7, which channels are in open connection with a fan or the like. As is indicated by the arrow G, the distributing structures 34 cause a two fold deviation of the air currents entering at 30, and the passage area $g$ in the deviated portion is several times larger than the entrance and exit areas 30 and 31 respectively. The water to be re-cooled falls freely through the compartments 35 where it comes into contact with the cooling air flowing transverse to the water.

I claim:

1. A water re-cooler for condensing plants on steam-driven vehicles, comprising in combination a plurality of sections each arranged to be traversed by a separate current of cooling air, means to assist the flow of cooling air through said sections, means for supplying water to be re-cooled to said sections, and a distributing structure substantially diagonally disposed in each section to deviate the direction of flow of the current of air passing through said section.

2. A water re-cooler for condensing plants on steam driven vehicles, comprising in combination a casing, a plurality of sections in said casing each arranged to be traversed by a separate current of cooling air and each having an inlet for the cooling air through said casing, and a perforated tray in connection with each section substantially diagonally arranged therein.

3. A water re-cooler for condensing plants on steam driven vehicles, comprising in combination a casing, a plurality of sections in said casing each arranged to be traversed by a separate current of cooling air and each having an inlet for the cooling air arranged in the external boundary surface of said casing, and a perforated tray in connection with each section, said trays being arranged in that diagonal plane which ensures the greatest length of the trays.

4. A water re-cooler for condensing plants on steam-driven vehicles, comprising in combination a casing, a plurality of sections in said casing each adapted to be traversed by a separate current of cooling air, the entrance areas to said sections being arranged in the lateral walls of the casing, a fan in open communication with the exit areas of the sections and adapted to assist the flow of cooling air through said sections, means for supplying water to be re-cooled to said sections, and a distributing structure in each section adapted to deviate the direction of flow of the current of air passing though the section, the area of the air passage through said structure being at least twice as great as the entrance and exit areas of the section.

5. An artificial draft re-cooler for the cooling water of condensing plants on locomotives, comprising cells traversed by the water to be cooled and by separate currents of cooling air, each cell having an air inlet formed directly in the external boundary surface of the re-cooler and an air outlet communicating with channels arranged in the longitudinal axis of the vehicle, and means for inducing air from the atmosphere through said cells and channels substantially opposite to the direction of flow of the water.

6. A water re-cooler for condensing plants on vehicles, comprising in combination a plurality of sections each adapted to be traversed by a separate current of cooling air, a twin fan adapted to assist the flow of cooling air through said sections and having a spiral casing exhausting at the top, means to actuate said fan, suction channels arranged about the longitudinal axis of the vehicle to either side of the fan and communicating with said sections which are arranged symmetrically in two series on both sides of said channels, means for supplying water to be re-cooled to said sections, and a distributing structure disposed in each section and adapted to deviate the direction of flow of the current of air passing through the section, the area of the air passing through said structure being at least twice as great as the entrance and the exit areas of the section in which it is arranged.

7. An artificial draught re-cooler for the cooling water of a condensing plant on a locomotive, comprising cells traversed in parallel by the water to be cooled and by separate currents of cooling air, and means for inducing air from the atmosphere through the cells, each cell having an air inlet aperture formed directly in the external boundary surface of the re-cooler.

8. A re-cooler for locomotives, comprising inclined cells traversed by the water to be re-cooled and by separate air currents, means for inducing an air current from the atmosphere through said cells, and a diagonal water-retarding partition in said cells of greater inclination than the cells and through which the induced current of air passes.

9. A re-cooler for locomotives, comprising a railway car frame and a re-cooling device mounted therein consisting of re-cooling cells having their outer ends open directly to the atmosphere at the sides of said frame and their inner ends open to a conduit common to the cells, a suction fan for drawing atmospheric air inward through said cells and conduit and discharging moisture laden air into the atmosphere upwardly through the top of the cooler.

In testimony that I claim the foregoing as my invention, I have signed my name.

HEINRICH BOLTSHAUSER.